United States Patent [19]
Doshi et al.

[11] Patent Number: 5,936,965
[45] Date of Patent: Aug. 10, 1999

[54] METHOD AND APPARATUS FOR TRANSMISSION OF ASYNCHRONOUS, SYNCHRONOUS, AND VARIABLE LENGTH MODE PROTOCOLS MULTIPLEXED OVER A COMMON BYTESTREAM

[75] Inventors: Bharat Tarachand Doshi, Holmdel; Subrahmanyam Dravida, Freehold; Kotikalapudi Sriram, Marlboro, all of N.J.

[73] Assignee: Lucent Technologies, Inc., Murray Hill, N.J.

[21] Appl. No.: 08/874,651

[22] Filed: Jun. 13, 1997

Related U.S. Application Data

[60] Provisional application No. 60/021,337, Jul. 8, 1996.
[51] Int. Cl.$^6$ ...................................................... H04J 3/16
[52] U.S. Cl. .......................................... 370/469; 370/465
[58] Field of Search ...................................... 370/465, 466, 370/469, 470, 471, 473, 412, 474, 468, 395

[56] References Cited

U.S. PATENT DOCUMENTS

| | | | |
|---|---|---|---|
| 5,467,342 | 11/1995 | Logston et al. ............................ | 370/17 |
| 5,533,021 | 7/1996 | Branstad et al. ......................... | 370/60.1 |
| 5,870,394 | 2/1999 | Oprea ........................................ | 370/392 |

*Primary Examiner*—Chi H. Pham
*Assistant Examiner*—Kim T. Nguyen

[57] ABSTRACT

The specification relates to a system supporting the transmission of multiple protocols over a single bytestream. The multiple protocol types supported include asynchronous transfer mode (ATM) protocol data units (PDUs), synchronous transfer mode (STM) PDUs, and variable length (VL) PDUs, as well as subtypes included within the aforementioned multiple protocol types. PDUs from higher layers are processed at three intermediate protocol layers where application layer PDUs are prepared, segmented, and repacked as asynchronous block multiplexing (ABM) PDUs. ABM PDUs include a type identification field. Cyclical redundancy checks and other error detection/correction techniques are optionally supported. ABM PDUs are multiplexed within a multiple protocol bytestream. Multiple protocol bytestream support is provided between a transmitter and receiver over a plurality of mediums, including but not limited to coaxial cable, wireless, optical fiber, hybrid fiber/coax, satellite, and twisted pair. Despite the various modes, protocols, PDU lengths, and different quality of service (QOS) requirements, support is provided over a common bytestream with a common physical layer datalink in either a point-to-point or broadcast environment.

43 Claims, 8 Drawing Sheets

METHOD AND APPARATUS FOR TRANSMISSION OF ASYNCHRONOUS, SYNCHRONOUS, AND VARIABLE LENGTH MODE PROTOCOLS MULTIPLEXED OVER A COMMON BYTESTREAM

CROSS REFERENCES TO RELATED APPLICATIONS

This application claims the benefit of U.S. Provisional Application No. 60/021,337, filed on Jul. 8, 1996.

FIELD OF THE INVENTION

This invention relates generally to digital communications and multimedia information transfer, and, in particular, to protocol architecture supporting various protocols over a common link.

BACKGROUND OF THE INVENTION

Consistent expansion of the demand for data and mixed multimedia information transfer available in a variety of application layer protocols have driven system and network providers to reassess current methods of transport for a wide variety of services which are offered or which can be offered. Higher (application) layer protocols are divided into many group types; for example, asynchronous transfer mode (ATM) protocol data units (PDUS), synchronous transfer mode (STM) PDUs, and variable length (VL) PDUs. VL PDUs can be internet protocol (IP) PDUs, I.E.E.E. 802.3 PDUs, point-to-point protocol (PPP) PDUs, etc. Thus, protocol subtypes exist within each group type as well. Some protocols carry data which is time critical information (e.g.—STM) while other protocols carry delay tolerant information. Current protocols supporting intermediate layers at a transmitter and receiver often are either incapable of handling a variety of application layer protocols, offer limited support of a variety of application layer protocols, or support a variety of application layer protocols but waste extensive amounts of transmission bandwidth as overhead.

For example, transmission of various modes or types of higher layer protocols within ATM packets is one current solution. Packing STM and VL PDUs as ATM cells requires using five bytes of overhead (since all ATM cells have a five byte header) and additional overhead expended with an ATM Adaptation Layer (AAL). Also, additional bandwidth is consumed as overhead in that not every ATM cell is completely filled with data and must be padded to conform to standard ATM length requirements. Much of the overhead is utilized for identifying connections, so end-to-end routing of the ATM cells across routes involving many switches can be carried out. For transmission over a single link, imposition of this overhead is wasteful. Similar waste occurs if internet protocol (IP) is used to carry multiple information types over a single link. Point-to-point (PPP) is another possibility for transmission over a single link. It has somewhat smaller overhead requirements than ATM or IP, but can not support multiple application types, especially those involving stringent delay requirements. Inefficiencies of current protocols are not as detrimental in systems or networks in which bandwidth capacity is underutilized or where the cost of bandwidth is not expensive. However, in systems or networks in which bandwidth capacity is a precious commodity and vigorously competed for, increasing the quantity of bandwidth available for multimedia and data transport and decreasing system transport overhead are valuable, useful, and desirable goals. Therefore, what is needed is a system or network which gracefully transmits various PDU types over a single link while minimizing the overhead demanded in exchange for system flexibility.

SUMMARY OF THE INVENTION

The present invention is a method and apparatus supporting the transmission of multiple application layer protocols multiplexed over a single bytestream for transmission over a single link. Higher layer (application layer) protocol data units (PDUs) are processed at three intermediate protocol layers at the transmitter before conversion to multiprotocol over a bytestream (MOB) PDUs and delivered to the medium access control (MAC) and physical (PHY) layers at the transmitter. The three intermediate protocol layers include a higher layer PDU preparation layer (HPPL), a segmentation, reassembly, and packing (SAR/PACK) layer, and an asynchronous block multiplexing (ABM) layer.

Application layers each deliver a channel of higher layer (HL) protocol data unit (PDU) bytestream to the transmitter HPPL. Channel HL-PDUs are queued at the HPPL layer for eventual multiplexing at the ABM layer. For example, each channel of ATM, STM, and VL PDU types are separately queued and processed at the HPPL and SAR/PACK layers in separate channels until multiplexed at the ABM layer. The HPPL extracts PDUs from each component bytestream and prepares the PDUs associated with each channel's bytestream to make them suitable for multiplexed transmission. Fixed length PDUs, such as ATM PDUs, require no additional preparation and pass straight through the HPPL. Similarly, VL PDUs containing a length field require no preparation either. VL PDUs which indicate length with a flag-based demarcation system do require preparation at the HPPL. Flags are removed from those VL PDUs which are flag-based and a length indicator field replaces the flag at the HPPL. The length indicator field indicates the number of payload bytes in a respective VL PDU. The HPPL at the receiver strips the inserted length indicator field utilized for MOB and replaces it with the original flag-based demarcation mechanism.

The SAR/PACK layer is made up of two distinct functions, a segmentation and reassembly (SAR) function and a packing (PACK) function. An individual bytestream one or both of the functions. At the transmitter, the bytestream created by each HL-PDU type is divided into fixed sized blocks. If HL-PDUs are larger than the fixed sized blocks, they will occupy more than one block thus representing the segmentation function. Smaller HL-PDUs are packed into larger fixed blocks. However, as long as a HL-PDU bytestream is not empty, the HL-PDU boundaries are delimited by special indicators. Further, a special pointer field identifies the beginning of the first HL-PDU in the ABM-PDU. One embodiment of the present invention also includes a cyclical redundancy check (CRC) as part of the PACK layer, thus providing error detection/correction capability.

The fixed blocks from the SAR/PACK layer of each HL-PDU bytestream enter individual queues. The ABM layer then multiplexes blocks from different SAR/PACK queues based on QOS requirements. At the receiver, the ABM layer demultiplexes blocks by type and delivers the demultiplexed blocks to the SAR/PACK layer. The SAR/PACK layer identifies and restores HL-PDUs and transmits the PDUs which successfully pass CRC to the HPPL.

An ABM common header (CH) is appended to the ABM payload for each ABM PDU at the ABM layer. The ABM header contains a type field to identify the higher layer protocol being supported by the bytestream from which a specific ABM PDU is created. In another embodiment of the present invention, the ABM-CH also contains an error protection field. In addition to appending an ABM-CH, the ABM layer functions as a protocol to multiplex component block types carrying fixed length ABM payloads (length fixed at the SAR/PACK layer) within a single bytestream. The length of fixed length ABM payloads is decided upon by the network or broadcast operator to conform with specific system needs and requirements and to maximize bandwidth efficiency while satisfying all QOS requirements. For example, if a network or broadcast operator determines that the primary mode of protocol support and transport involves the ATM protocol, then an ABM payload length of fifty-three bytes would be a prudent choice. However, if the majority of system bandwidth is utilized in the transport of lengthy IP frames, then choosing a relatively larger ABM payload capacity would provide greater bandwidth efficiency. In another exemplary embodiment involving interactive voice or multimedia applications, the need for very small delay may call for a relatively small block size. Once an ABM payload length is selected, all modes and types of payloads are transported within fixed length blocks of the selected length. Conversion and segmentation of frames too lengthy to comport with the selected length is accomplished at the SAR function layer.

As an illustrative, but not exhaustive example, the MOB support provided with the present invention encompasses synchronous transfer mode (STM) protocol, asynchronous transfer mode (ATM) constant bit rate (CBR) protocol, ATM variable bit rate (VBR) protocol, ATM available bit rate (ABR) protocol, internet protocol (IP), internet packet exchange protocol (IPX), I.E.E.E. 802.3 protocol, frame relay (FR) protocol, and others. This support is provided between a transmitter and receiver over any one of a plurality of mediums, including but not limited to coaxial cable, wireless, optical fiber, hybrid fiber/coax, satellite, and twisted pair. The unit of bandwidth available to ABM PDUs may encompass the entire medium (e.g.—the complete wavelength of a fiber), or a channel created within the medium (e.g.—a portion of the available fiber bandwidth, or a portion of the bandwidth in OC-3 or OC-12). Despite the various modes, protocols, PDU lengths, and different quality of service (QOS) requirements, support is provided over a common bytestream with a common physical layer datalink in either a point-to-point or broadcast environment.

BRIEF DESCRIPTION OF THE DRAWINGS

A more complete understanding of the present invention may be obtained from consideration of the following description in conjunction with the drawings in which.

DETAILED DESCRIPTION

The present invention encompasses a system supporting the transmission and reception of multiple protocols over a single bytestream. Protocol data units (PDUs) from higher layers are processed at three intermediate protocol layers before conversion to multiprotocol over a bytestream (MOB) PDUs and delivery to the medium access control (MAC) and physical (PHY) layers at the transmitter. As an illustrative, but not exhaustive example, the MOB support provided with the present invention encompasses asynchronous transfer mode (ATM) constant bit rate (CBR) protocol, ATM variable bit rate (VBR) protocol, ATM available bit rate (ABR) protocol, internet protocol (IP), internet packet exchange protocol (IPX), I.E.E.E. 802.3 protocol, synchronous transfer mode (STM) protocol, frame relay (FR) protocol, and others. This support is provided between a transmitter and receiver over a plurality of media, including but not limited to coaxial cable, wireless, optical fiber, hybrid fiber/coax, satellite, and twisted pair. Despite the various modes, protocols, PDU lengths, and different quality of service (QOS) requirements, support is provided over a common bytestream with a common physical layer datalink in either a point-to-point or broadcast environment.

FIGS. 1 through 9, and the accompanying detailed description contained herein, are to be used as an illustrative example of one advantageous embodiment of the present invention, and should not be construed as the only manner of practicing the present invention. Numerous modifications and alternative embodiments of the invention will be apparent to those skilled in the art in view of the following description. Details of the structure may be varied substantially without departing from the spirit of the invention.

Figure 1:
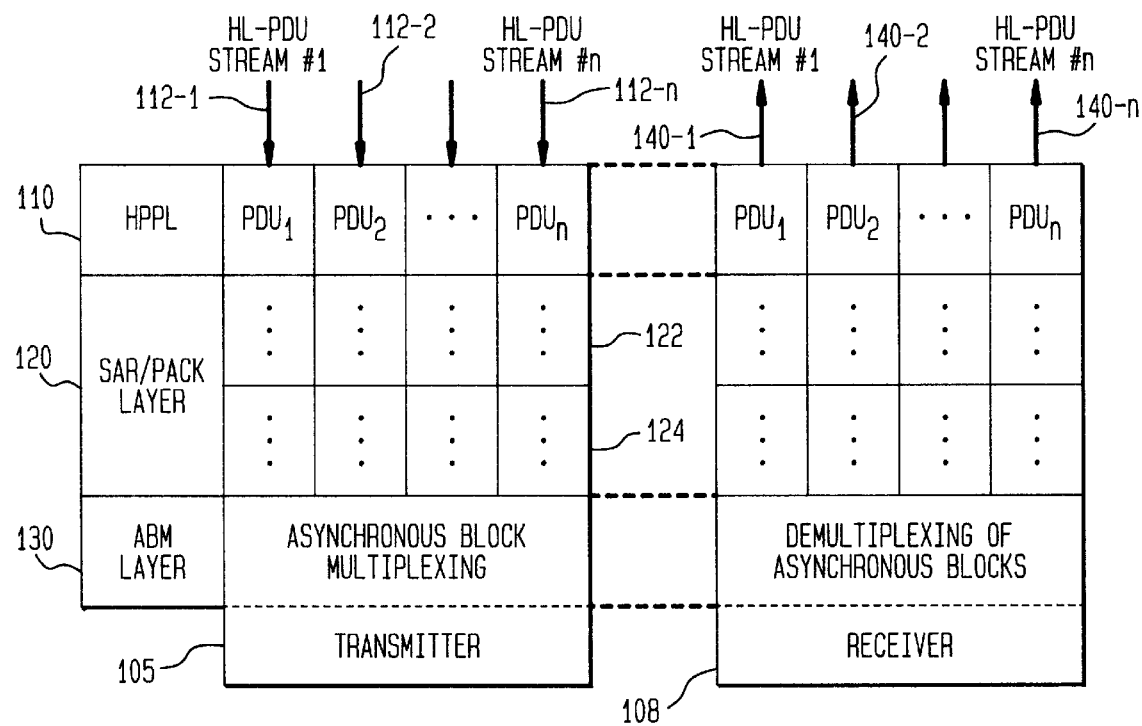
FIG. 1 is a representation of an exemplary configuration of the various protocol layers associated with a multiprotocol over a bytestream (MOB) arrangement, as incorporated in accordance with the present invention.

FIG. 1 is a exemplary representation of the various protocol layers associated with the present invention. Multiprotocol over a bytestream (MOB) maintains three separate layers at the transmitter, with respective matching layers at the receiver. The three protocol layers maintained are the higher layer PDU preparation layer (HPPL) 110, the segmentation and reassembly (SAR) and packing (PACK) layer 120, and the asynchronous block multiplexing (ABM) layer 130. Higher application layers each deliver a channel of HL-PDU bytestream 112 to the HPPL 110 at the transmitter 105. Bytes of single mode type information are queued at the HPPL layer 110 for eventual multiplexing at the ABM layer 130. For example, FIG. 1 illustrates n bytestreams 112 of HL-PDUs queued at the transmitter 105. HL-PDU bytestream#1 112-1 is representative of a single transport mode bytestream, such as ATM, STM or variable length (VL), queued for transmission. Similarly, HL-PDU bytestream#2 112-2 is representative of a single transport mode bytestream, such as ATM, STM or VL. Each successive HL-PDU bytestream through HL-PDU bytestream#n 112-n is representative of a single transport mode bytestream. For example, HL-PDU bytestream#1 112-1 could be assigned to ATM cells, HL-PDU bytestream#2 112-2 could be assigned to IP frames, etc. At the transmitter, the HPPL 110 extracts PDUs from each component bytestream and prepares the bytes of the bytestream to make them suitable for transmission using MOB. Fixed length PDUs, such as ATM PDUs, require no additional preparation and pass straight through the HPPL 110. In a like manner, VL PDUs that contain a length header require no preparation either. VL protocols which delineate PDUs with a flag-based demarcation system do require preparation at the HPPL 110. Flags are removed from flag-based VL protocol bytestreams and a length indicator field replaces the flag at the HPPL. The length indicator field indicates the number of payload bytes in a respective VL PDU. The HPPL 110 at the receiver strips the inserted length indicator field utilized for MOB and replaces it with the original flag-based demarcation mechanism.

The SAR/PACK layer 120 is made up of two distinct functions, a segmentation and reassembly (SAR) function 122 and a packing (PACK) function 124. At the transmitter 105, the SAR 122 function creates blocks of a fixed size from individual HL-PDU bytestreams. The process of creating blocks through segmentation is performed in such a way that the receiver 108 can regain boundary synchronization if lost. More detail regarding the mode through which synchronization is assured will be described in detail later. One embodiment of the present invention also includes a cyclical redundancy check (CRC) as a part of the PACK 124 layer, to provide for error detection/correction capability. When error detection/correction capability is employed, the payload block size is correspondingly smaller. At the receiver 108, the SAR/PACK layer 120 identifies and restores HL-PDUs and transmits the PDUs which successfully pass CRC to the HPPL 110. The segmentation function 122 at the transmitter (as well as the reassembly function at the receiver) are performed when the HL-PDUs are larger than the selected block payload size. If HL-PDUs are equal to or smaller than selected block payload size, then the segmentation function 122 (and the subsequent reassembly function at the receiver) is not required. After completion of PDU bytestream processing at the SAR/PACK layer 120 of the transmitter 105, individual mode HL-PDU bytestreams are delivered to and queued at the asynchronous block multiplexing (ABM) layer 130. The ABM layer creates fixed sized ABM PDUs from the various HL-PDU bytestreams and multiplexes them over a common bytestream according to QOS requirements. The product of the transmitter ABM layer 130 is a MOB output, comprised of sequential fixed sized ABM PDUs carrying one or more modes of data. Each PDU, however, is assigned to a specific mode of data. Therefore, an individual PDU will not contain more than one PDU type. At the receiver 108, the ABM layer 130 demultiplexes component ABM PDUs, directs components of the same type to the appropriate higher layer bytestream channel for SAR/PACK layer 120 and HPPL 110 processing. Reconstructed HL-PDU bytestreams 140-1, 140-2, . . . , 140-n at the receiver 108, representing a duplication of the original HL-PDU bytestreams 112-1, 112-2, ..., 112-n entering the transmitter MOB at the HPPL layer 110, are transported to their respective higher application layer.

Figure 2A:
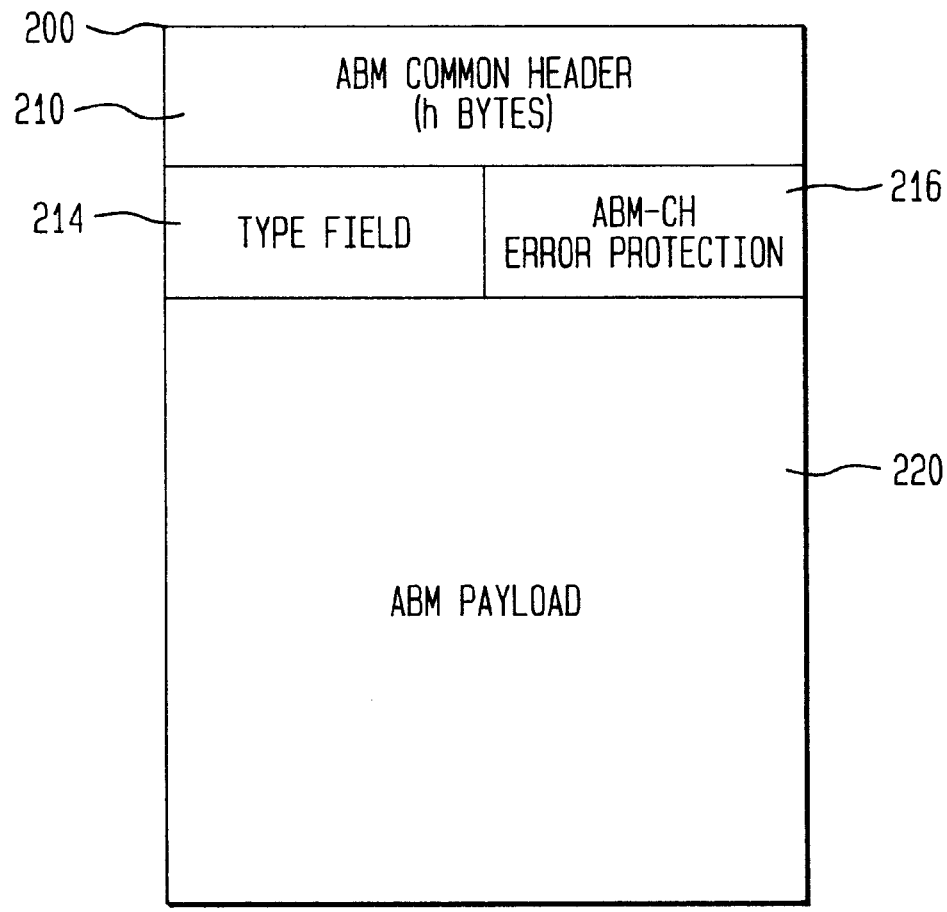
FIG. 2A is a diagram illustrating an exemplary grouping of constituent components associated with an asynchronous block multiplexing (ABM) protocol data unit (PDU), as incorporated in accordance with the present invention.

FIG. 2A is a diagram illustrating an exemplary grouping of constituent components associated with an asynchronous block multiplexing (ABM) protocol data unit (PDU) 200, as incorporated in accordance with the present invention. An ABM common header (CH) 210 is appended to the ABM payload 220 for each ABM PDU 200 at the ABM layer. The ABM header contains a type field 214 to identify the higher layer protocol being supported by the bytestream from which a specific ABM PDU is created. In another embodiment of the present invention, the ABM-CH also contains an error protection field 216. The length (h) of the ABM-CH is chosen based upon two criteria: (i) the number of HL protocols supported and (ii) the desired level of common header error protection.

In addition to appending an ABM-CH 210, the ABM layer functions as a protocol to multiplex component block types carrying fixed length ABM payloads (length fixed at the SAR/PACK layer) within a single bytestream for transmission over a single link. The length of the fixed length ABM payloads is decided upon by the network or broadcast operator to conform with specific system needs and requirements and to maximize bandwidth efficiency based upon relative mode density. For example, if a network or broadcast operator determines that the primary mode of protocol support and transport involves the ATM protocol, then an ABM payload length of fifty-three bytes would be a prudent choice. However, if the majority of system bandwidth is utilized in the transport of lengthy IP frames, then a choosing a relatively larger ABM payload capacity would provide greater bandwidth efficiency. Once an ABM payload length is selected, all modes and types of payloads are transported within fixed length blocks of the selected length. Conversion and segmentation of frames too lengthy to comport with the selected length is accomplished at the SAR function layer.

Figure 2B:
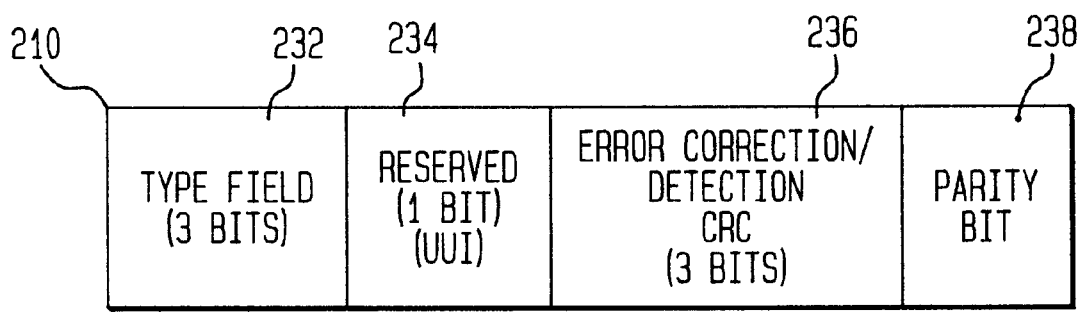
FIG. 2B is an exemplary representation of an ABM PDU header, as incorporated in accordance with the present invention.

FIG. 2B represents an illustrative embodiment of an ABM PDU common header (CH) 210 as incorporated in accordance with the present invention. The CH 210 in this illustrative embodiment comprises a type field 232 as well as error protection fields. The three bit type field 232 of this embodiment can identify eight higher layer protocols for support over the MOB multiplexer. The length of the type field 232 can be adjusted to support a greater number of higher layer protocols if desired. Additionally, a one bit user to user information (UUI) field 234, a three bit cyclical redundancy check (CRC) field 236, and a parity bit 238 are included. The type field 232 identifies the content block type, that is, it identifies the higher layer protocol being supported by the bytestream from which a specific payload is created. In this illustrative embodiment, the CH type field 232 is protected against errors by a CRC error correction/detection field 236 and the parity bit 238. Protecting the type field 232 from errors is performed so that an inability to identify the specific higher layer protocol composition of a PDU at the receiver is minimized.

Figure 3A:
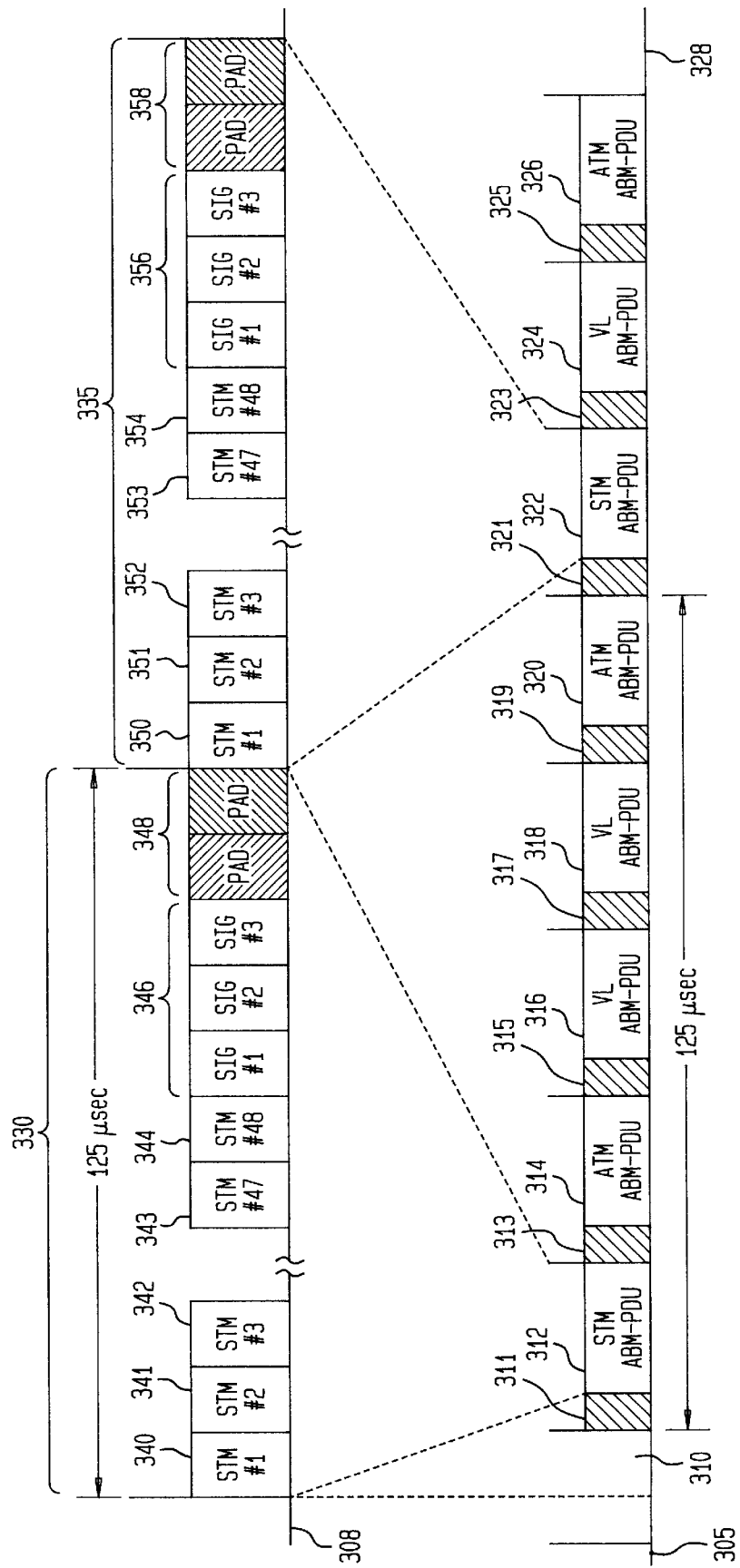
FIG. 3A is an exemplary representation of a plurality of synchronous transfer mode (STM) higher layer (HL) PDU channels and the result of conversion to STM ABM PDUs and insertion within a MOB configuration, as incorporated in accordance with the present invention.
Figure 3B:
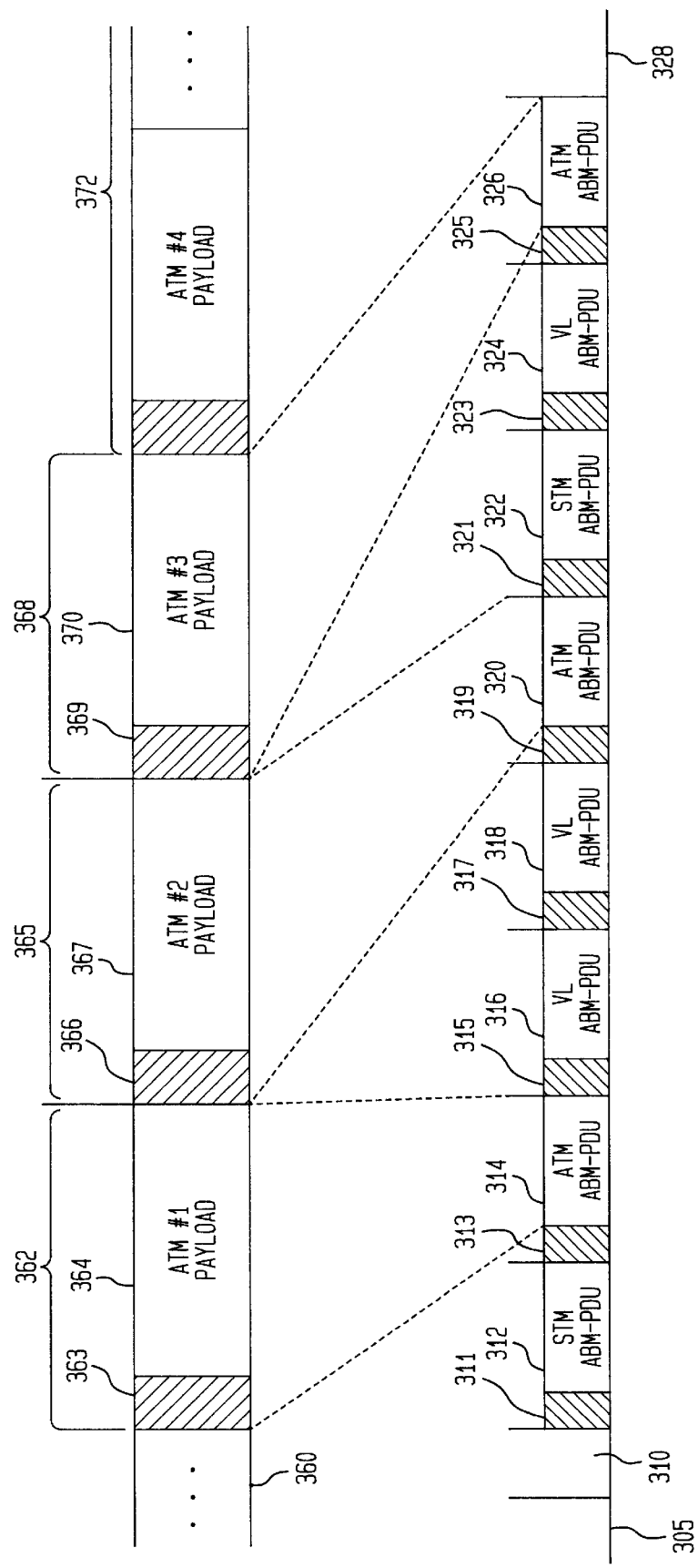
FIG. 3B is an exemplary representation of an asynchronous transfer mode (ATM) higher layer (HL) PDU queued bytestream and the result of conversion to ATM ABM PDUs and insertion within a MOB configuration, as incorporated in accordance with the present invention.
Figure 3C:
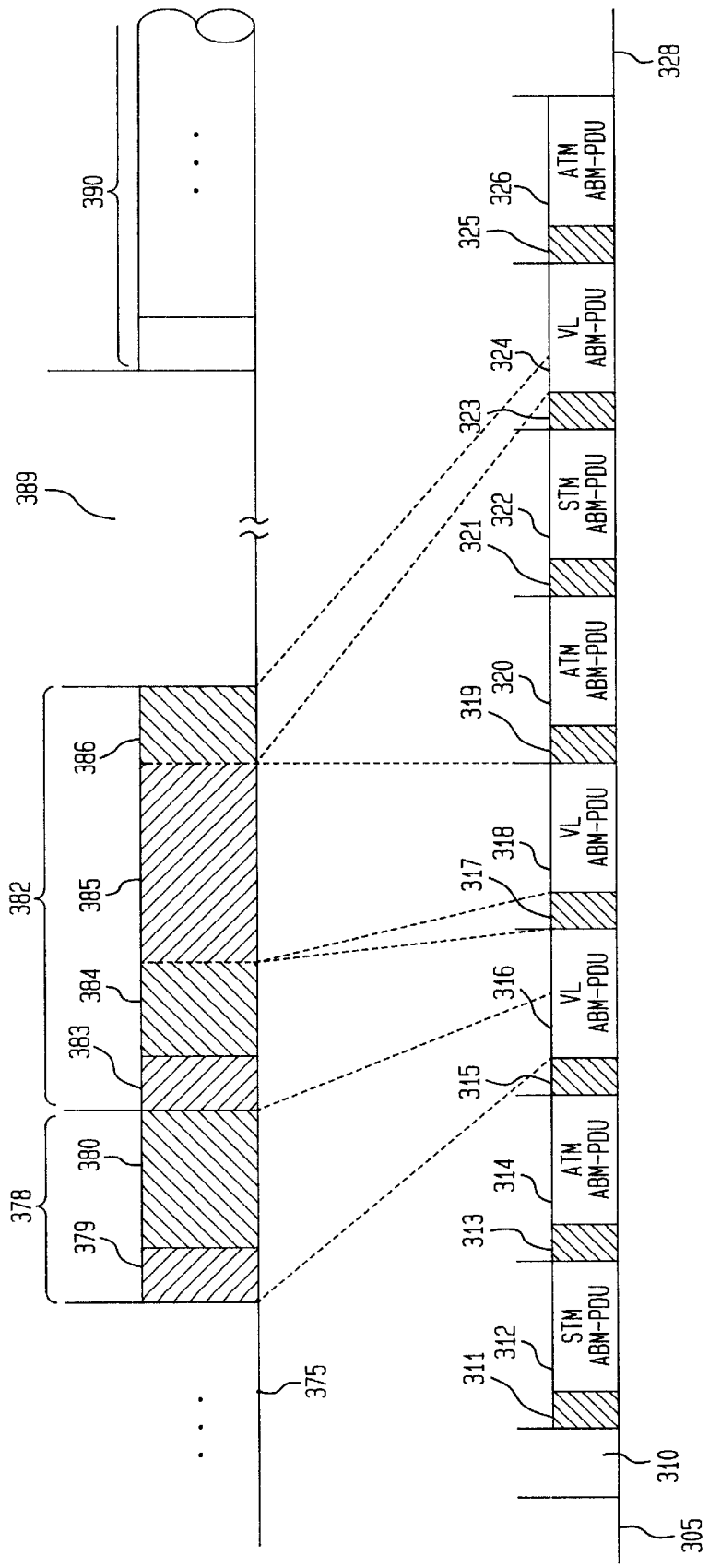
FIG. 3C is an exemplary representation of a variable length mode (VL) higher layer (HL) PDU queued bytestream and the result of conversion to VL ABM PDUs and insertion within a MOB configuration, as incorporated in accordance with the present invention.

The following description concerning FIGS. 3A–3C provides an illustrative example of the incorporation of multiple protocols within a bytestream. FIG. 3A is an exemplary representation of one embodiment of the present invention in which a plurality of STM HL PDU channels are processed at the HPPL and SAR/PACK protocol layers, queued at the MOB multiplexer as STM ABM PDUs and multiplexed within an ABM PDU bytestream. The present example assumes that an ABM PDU length is selected which is sized to exactly accommodate an ATM PDU as the ABM payload with additional byte/bytes appended as a header/trailer. STM data is represented as a bytestream of STM channel connections, framed, sized, and queued at the SAR/PACK layer 308. Since this illustrative embodiment utilizes ABM payload lengths to support transport of one ATM PDU within each ABM PDU, the length available for an STM ABM PDU is fifty-three bytes. STM frame (j-1) 330, being fifty-three bytes in length, can therefore support forty-eight STM voice (DSO) channels. In the instant embodiment, each STM frame is 125 microseconds long at the STM HL-PDU layer, the HPPL layer, and the SAR/PACK layer, and each STM channel is represented by one byte per STM channel per frame. Therefore, each STM channel is capable of transport of 64,000 bits of data per second. In STM frame (j-1) 330, forty-eight DSO channels are available 340 through 344, and supported by three bytes for STM signaling 346. Two additional bytes are used for padding 348, and therefore the total number of bytes in frame (j-1) 330 is fifty-three, the exact equivalent to an ATM PDU. In frame j 335, the next byte of data for each STM channel is provided. Therefore, forty-eight STM DSO channels 350–354 are packed and provided for transport at the SAR/PACK layer for frame j 335 along with three STM signaling bytes 356 and two padding bytes 358. A respective channel in each frame is separated by 125 microseconds.

STM frames are multiplexed at the ABM layer. Prior to multiplexing, the appropriate header/trailer is appended, as will be described subsequently. A continuous MOB output 305 is the result of multiplexing ABM PDUs and a portion of the continuous bytestream is represented with ABM headers and ABM payloads 311 through 326. Those ABM PDUs prior to the first illustrated ABM PDU 312 are collectively represented 310. Those ABM PDUs subsequent to the last illustrated ABM PDU 326 are also collectively represented 328. The portion of the continuous MOB shown demonstrates that specific protocol mode regions are not reserved, but rather interspersed into the continuous bytestream by the multiplexer. Multiplexing priority for PDUs is not necessarily on a 'first in/first out' basis, but rather priority is given to those modes which are delay sensitive and those modes that are delay insensitive could experience significant delay while queued during periods of high data traffic. First priority is given to STM ABM PDUs. With the present embodiment in which an STM frame is 125 microseconds long, the quantity of time between the multiplexing of a first STM frame and the next STM frame representing the same STM channels is approximately 125 microseconds. Flexibility is inherent in the present invention because the duration of time between STM ABM PDUs is not required to be exactly 125 microseconds. At the receiver, a demultiplexer which separates the constituent PDUs into like kind, transports STM ABM PDUs to a buffer which distributes the individual channel bytes at the appropriate time. Therefore, although it is envisioned that an STM ABM PDU conveying consecutive frames of the same STM channels will be separated by approximately 125 microseconds, it is possible to accept delay up to an additional 125 microseconds. Equipping the receiver with additional buffer memory allows the receiver to properly playout STM channel data which has encountered an even greater transmission delay.

In another embodiment of the present invention, consecutive STM frames at the SAR/PACK layer are separated by one millisecond instead of 125 microseconds. Each STM channel carries eight bytes of data per millisecond, again resulting in 64,000 bits of data per second, the equivalent of a DSO channel. In fact, any quantity of time between STM frames carrying the same STM channels are acceptable if: (i) the total quantity of data transmitted per individual channel is at least equivalent to 64,000 bits per second, and (ii) the delay imposed by infrequent transmission does not exceed acceptable delay for STM quality of service (QOS) requirements. Therefore, it is envisioned that a duration of three milliseconds between consecutive STM frames carrying the same STM channels is at the limit of acceptability if the imposition of a minimum of six millisecond round trip delay for a voice communication channel is made (as is done in access networks that do not make use of echo cancellation).

In yet another embodiment of the present invention relating to the inclusion of STM signals, STM channels are not multiplexed at all. In this embodiment, a STM region is created with reserved slots for STM channels. An STM region is reserved periodically as described in a pending U.S. patent application, having a filing date of Mar. 6, 1997, and Ser. No. 08/812,462, entitled "Method and Apparatus Enabling Synchronous Transfer Mode, Variable Length and Packet Mode Access for Multiple Services Over a Broadband Communication Network," (U.S. Provisional Application No. 60/013,738 filed on Mar. 20, 1996). An STM region is reserved every 125 microseconds with one byte allocated for each active STM channel, resulting in 64,000 bits per second per channel. If an STM region is reserved every 1 millisecond instead, then eight bytes are allocated for each active STM channel, again resulting in 64,000 bits per second per channel. The remaining portion of the continuous MOB not reserved for an STM region is provided for asynchronous block multiplexing all other HL-PDUs as previously described.

FIG. 3B is an exemplary representation of one embodiment of the present invention in which a plurality of ATM HL PDUs are processed at the HPPL and SAR/PACK protocol layers, queued at the MOB multiplexer as ATM ABM PDUs and multiplexed within an ABM PDU bytestream. As previously described, a continuous MOB output 305 is the result of multiplexing ABM PDUs and a portion of the continuous bytestream is represented with ABM headers and ABM payloads 311 through 326. Those ABM PDUs prior to the first illustrated ABM PDU 312 are collectively represented 310. Those ABM PDUs subsequent to the last illustrated ABM PDU 326 are also collectively represented 328. The portion of the continuous MOB shown demonstrates that specific protocol mode regions are not reserved, but rather interspersed into the continuous bytestream by the multiplexer.

A higher layer ATM PDU bytestream 360 is illustrated at the SAR/PACK layer. As before, the present example assumes that an ABM PDU length is selected which is sized to exactly accommodate an ATM PDU with an additional appended header or trailer. ATM PDUs are queued at the ABM multiplexer for transmission within the MOB. ATM #1 PDU 362, composed of an ATM #1 payload 364 and a five byte ATM header 363 is shown as being multiplexed into the MOB as an ATM ABM PDU 314 with appended ABM header/trailer 313. Since no particular region is reserved in the MOB for specific protocol support, the following ABM PDU is of a type queued at the multiplexer and determined by the multiplexer as having the next greatest priority for incorporation within the bytestream. Since an STM ABM PDU 312 had just previously been multiplexed into the MOB, another STM ABM PDU 322, representing the same STM channels, is not multiplexed into the MOB for approximately the next 125 microseconds (assuming, of course, that an embodiment featuring a 125 microsecond frame repetition period was selected). In the example as illustrated in FIG. 3B, the multiplexer awards priority for incorporation within the MOB in the next two ABM PDUs to VL ABM PDUs 316 and 318.

The next queued ATM PDU to be multiplexed is ATM #2 PDU 365, comprising an ATM #2 payload 367 and a five byte ATM header 366. The fifty-three byte ATM #2 PDU 365 is multiplexed into the MOB as an ATM ABM PDU 320 with appended ABM header/trailer 319. The next ATM PDU queued at the multiplexer is ATM #3 PDU 368 composed of an ATM #3 payload 370 and a five byte ATM header 369 is shown as being multiplexed into the MOB as an ATM ABM PDU 326 with appended ABM header/trailer 325. ATM #4 and beyond 372 are represented to illustrate the continuous nature of an ATM bytestream queued prior to multiplexing and at higher layers.

FIG. 3C is an exemplary representation of one embodiment of the present invention in which a plurality of VL HL PDUs are processed at the HPPL and SAR/PACK protocol layers, queued at the MOB multiplexer as VL ABM PDUs and multiplexed within an ABM PDU bytestream. As previously described, a continuous MOB output 305 is the result of multiplexing ABM PDUs and a portion of the continuous bytestream is represented with ABM headers and ABM payloads 311 through 326. Those ABM PDUs prior to the first illustrated ABM PDU 312 are collectively represented 310. Those ABM PDUs subsequent to the last illustrated ABM PDU 326 are also collectively represented 328. The portion of the continuous MOB shown demonstrates that specific protocol mode regions are not reserved, but rather interspersed into the continuous bytestream by the multiplexer.

A VL bytestream 375 is shown at the SAR/PACK and higher layers. VL frame #1 378 is comprised of VL payload #1 380 and its associated header 379. In a similar manner, VL frame #2 382 is comprised of a VL payload 384 through 386 and its associated header 383. Periods for which no VL frames are queued at the multiplexer are represented by the empty transmission space 389 following VL frame #2 382. Subsequent VL frames 390 are also represented, but only VL frame #1 378 and VL frame #2 382 are shown being multiplexed into the continuous MOB. The present example again assumes that an ABM PDU length is selected which is sized to exactly accommodate an ATM PDU with an additional appended header/trailer. Since this illustrative embodiment utilizes ABM payload lengths to support transport of one ATM PDU within each ABM PDU, the length of each ABM PDU is fifty-three bytes.

VL frame #1 378 is a variable length frame shorter than fifty-three bytes, so it does not completely fill a VL ABM PDU 316 when multiplexed into an MOB ABM PDU. A header/trailer 315 is attached for type and synchronization information and an optional CRC field. Since the VL ABM PDU is not completely filled, the remaining space is dedicated to that portion of the next VL PDU waiting to be multiplexed onto the MOB or the remaining space is padded and the next VL PDU is assigned to start at the beginning of a subsequent ABM PDU. In this example, each ABM PDU space is fully utilized, so the remaining portion is assigned to the next VL PDU waiting to be multiplexed, or portion thereof. The next VL PDU, VL frame #2 382 is segmented at the SAR/PACK layer to fit within the remaining portion of the current VL ABM PDU 316. VL frame #2 header 383 and that portion of VL frame #2 384 which will utilize the remaining available space in the current VL ABM PDU 316 are multiplexed into the available space. The VL ABM PDU header/trailer 315 contains segmentation and synchronization information so that the boundaries between VL frames are reconstructed at the receiver. The next portion of VL frame #2 385 is segmented at the SAR/PACK layer to fit within the entirety of the next available VL ABM PDU 318. A VL ABM PDU header/trailer 317 is concatenated with VL ABM PDU 318 as well. The final portion of VL frame #2 386 is smaller than the available space in the next available VL ABM PDU 324 and therefore is fully incorporated within a portion of VL ABM PDU 324. A VL ABM PDU header/trailer 323 is concatenated with VL PDU 324 as well. The prior description concerning FIGS. 3A–3C provides an illustrative example of the incorporation of multiple protocols within a bytestream. Details describing the header/trailer information incorporated in various operating embodiments of the present invention are presented later in this description.

As previously described, the present invention supports many higher layer protocols, including but not limited to asynchronous transfer mode (ATM) constant bit rate (CBR) protocol, ATM variable bit rate (VBR) protocol, ATM available bit rate (ABR) protocol, internet protocol (IP), internet packet exchange protocol (IPX), I.E.E.E. 802.3 protocol, synchronous transfer mode (STM) protocol, and frame relay (FR) protocol. The asynchronous block multiplexer (ABM) of the present invention supports eight major categories of ABM PDUs. They are: (i) Fixed Length Aligned Single Block (FLA/SB), (ii) Fixed Length Aligned Multiple Blocks (FLA/MB), (iii) Fixed Length Aligned Fractional Blocks (FLA/FB), (iv) Fixed Length Non-Aligned (FLNA), (v) Variable Length Aligned Single Block (VLA/SB), (vi) Variable Length Aligned Multiple Blocks (VLA/MB), (vii) Variable Length Non-Aligned (VLNA), and (viii) Position Based Multiplexed Aligned (PBMA). Each of the higher layer protocols are supported by each of the eight major categories of ABM PDUs, however, certain ABM PDUs are better suited in terms of bandwidth efficiency to transport specific higher layer PDUs. For example, if anticipated system traffic is primarily ATM traffic, then a suitable choice would be either FLA/SB or FLA/MB, since either choice will possess a high bandwidth efficiency in the transport of ATM cells as opposed to other choices. Other traffic protocol types are also supported, but their transmission is not as efficient within FLA/SB or FLA/MB as is an ATM cell. PBMA is a suitable choice for a system where the majority of traffic is STM protocol traffic, whereas FLNA or VLNA are efficient higher layer multiprotocol choices. A description of each of the major categories of ABM PDUs follows.

Figure 4:
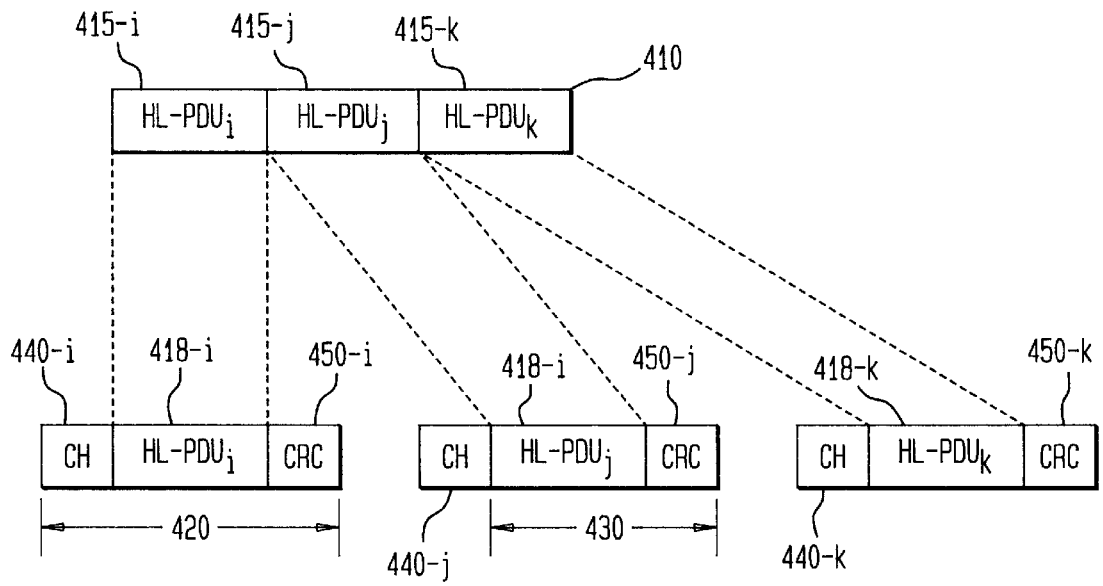
FIG. 4 is an exemplary representation of a HL-PDU and its incorporation within a Fixed Length Aligned Single Block (FLA/SB) ABM PDU, in accordance with the present invention.

FIG. 4 is an exemplary representation of a HL-PDU 415 and its incorporation within a Fixed Length Aligned Single Block (FLA/SB) ABM PDU 420, in accordance with the present invention. Conversion and multiplexing of a HL-PDU into a MOB as an ABM PDU occurs after link control negotiations between the transmitter and the receiver, specified later in the present description, have been completed. Therefore the transmitter and receiver each understand which higher layer protocols are being supported, the major category of ABM PDU utilized, the length of a HL-PDU after segmentation, the length of an ABM PDU, the information contained in an ABM PDU common header including the type field, and whether an error correction header/trailer is included. A SAR/PACK layer bytestream 410 is segmented into fixed byte HL-PDUs 415. Shown are three HL-PDU segments, HL-PDU$_i$415-i, HL-PDU$_j$415-j, and HL-PDU$_k$ 415-k, from the HL-PDU bytestream 410. A HL-PDU segment 418 is appended with a CRC field 450 of length c, if desired, at the SAR/PACK layer. The result is a SAR/PACK layer PDU 430. Application of CRC is optional, since (i) many higher layer protocols maintain their own error correction/detection schemes and (ii) some types of data are relatively error tolerant. The ABM layer creates a common header (CH) 440, having a length (h) as described in detail earlier, and appends the CH 440 to the SAR/PACK layer PDU 430 to create a FLA/SB ABM PDU 420. The length (l) of a FLA/SB ABM PDU 420 is designed to incorporate exactly one HL-PDU segment, with no excess space required for padding. Therefore, each ABM PDU 420 is equal in length to the HL-PDU segmented length, plus the length of an ABM common header, plus the length of an additional CRC field, if incorporated. Total length of a HL-PDU segment incorporated within an FLA/SB ABM PDU is therefore equal to [l-h-c] if a CRC field is included, and equal to [l-h] if a CRC field is not included.

Figure 5:
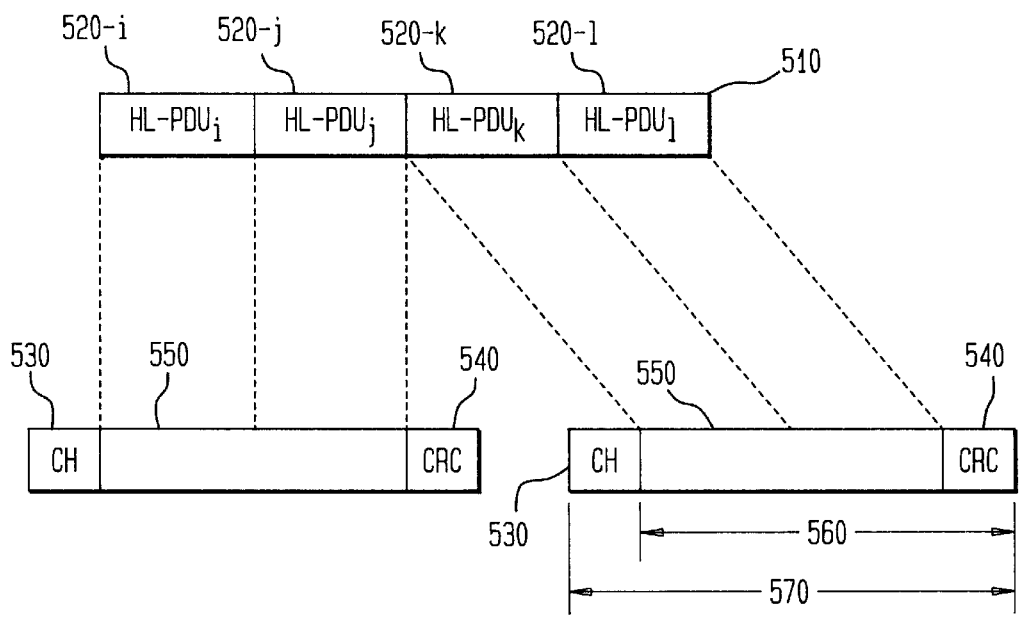
FIG. 5 is an exemplary representation of a HL-PDU and its incorporation within a Fixed Length Aligned Multiple Block (FLA/MB) ABM PDU, in accordance with the present invention.

FIG. 5 is an exemplary representation of a HL-PDU and its incorporation within a Fixed Length Aligned Multiple Block (FLA/MB) ABM PDU 570, in accordance with the present invention. A FLA/MB ABM PDU 570 is comprised of a integral number ($N_{PDU}$) of fixed sized HL-PDU segments 520. Conversion and multiplexing of a HL-PDU into a MOB as an ABM PDU occurs after link control negotiations between the transmitter and the receiver, specified later in the present description, have been completed. Therefore the transmitter and receiver each understand which higher layer protocols are being supported, the major category of ABM PDU utilized, the length of a HL-PDU after segmentation, the integral number of HL-PDU segments incorporated within each ABM PDU, the length of an ABM PDU, the information contained in an ABM PDU common header including the type field, and whether an error correction header/trailer is included. A SAR/PACK layer bytestream 510 is segmented into fixed byte HL-PDU segments 520. Shown are four HL-PDU segments, HL-PDU$_i$520-i, HL-PDU$_j$520-j, HL-PDU$_k$520-k, and HL-PDU$_l$520-l, from the HL-PDU bytestream 510. Each FLA/MB ABM PDU 570, in the example illustrated in FIG. 5, is comprised of two HL-PDU segments 550. Therefore, $N_{PDU}$ equals two in the present example. In addition, each concatenation of two HL-PDUs is appended with a CRC field 540 of length c, if desired, at the SAR/PACK layer, resulting in a SAR/PACK layer PDU 560. Again, application of CRC is optional. The ABM layer creates a common header (CH) 530 of length h, as described in detail earlier, and appends the CH 530 to the SAR/PACK layer PDU 560 to create a FLA/MB ABM PDU 570. The length (l) of a FLA/SB ABM PDU 570 is designed to incorporate exactly $N_{PDU}$ HL-PDU segments 520, with no excess space required for padding, therefore bandwidth required for overhead is minimized. Total length of each HL-PDU segment incorporated within a FLA/MB ABM PDU is therefore equal to [(l-h-c)/$N_{PDU}$] if a CRC field is included, and equal to [(l-h)/$N_{PDU}$] if a CRC field is not included.

Figure 6:
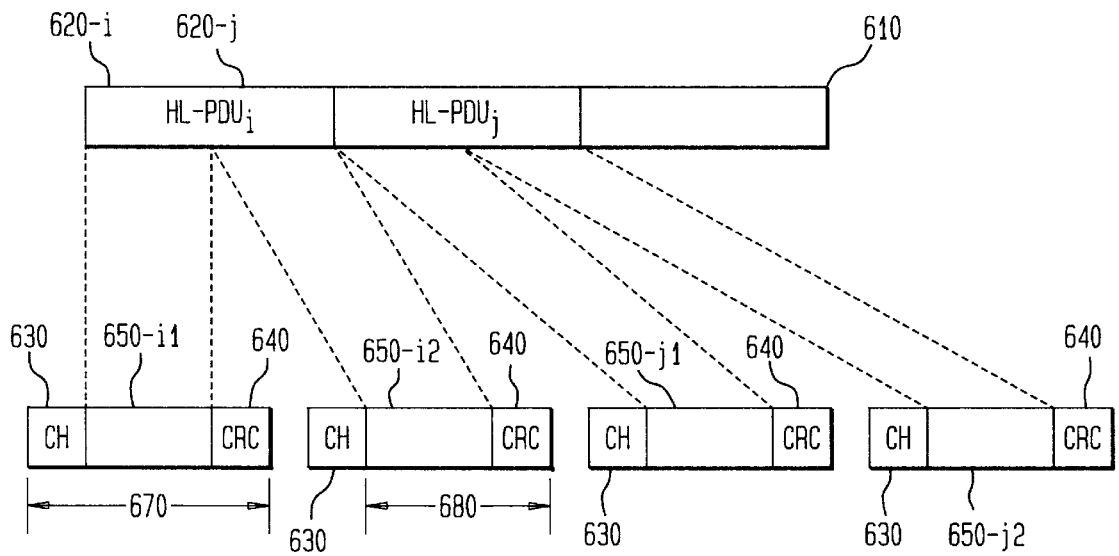
FIG. 6 is an exemplary representation of a HL-PDU and its incorporation within a Fixed Length Aligned Fractional Block (FLA/FB) ABM PDU, in accordance with the present invention.

FIG. 6 is an exemplary representation of a HL-PDU 620 and its incorporation within Fixed Length Aligned Fractional Block (FLA/FB) ABM PDUs, in accordance with the present invention. Segmentation of HL-PDUs 620 at the SAR/PACK layer 610 is performed so that an integral number ($n_{pdu}$) of HL-PDU segments are created, each equally sized, and each segment is carried by a FLA/FB ABM PDU without padding. Again, conversion and multiplexing of a HL-PDU into a MOB as an ABM PDU occurs after link control negotiations between the transmitter and the receiver, specified later in the present description, have been completed. Therefore the transmitter and receiver each understand which higher layer protocols are being supported, the major category of ABM PDU utilized, the length of a HL-PDU after segmentation, the fraction of HL-PDU segmented for each ABM PDU, the length of an ABM PDU, the information contained in an ABM PDU common header including the type field, and whether an error correction header/trailer is included. For example, since HL-PDU$_i$620-i is equally divided, $n_{pdu}$ is equal to two in the present case. The first segment of HL-PDU$_i$620-i is multiplexed at the ABM layer as the payload of a first FLA/FB ABM PDU 650-i1 and the second segment of HL-PDU$_i$ 620-i is multiplexed at the ABM layer as the payload of a second FLA/FB ABM PDU 650-i2. Likewise, the first segment of HL-PDU$_j$620-j is multiplexed at the ABM layer as the payload of a third FLA/FB ABM PDU 650-j1 and the second segment of HL-PDU$_j$620-j is multiplexed at the ABM layer as the payload of a fourth FLA/FB ABM PDU 650-j2. Each ABM PDU payload 650 is appended with a CRC field 640 of length c, if desired, at the SAR/PACK layer, resulting in a SAR/PACK layer PDU 680. Again, application of CRC is optional. The ABM layer creates a common header (CH) 630 of length h, as previously described, and appends the CH 630 to the SAR/PACK layer PDU 680 to create a FLA/FB ABM PDU 670. The length (l) of an ABM PDU payload 650 is selected to incorporate exactly $1/n_{pdu}$ HL-PDUs (one HL-PDU segment). Transmission bandwidth is efficiently utilized since padding is not used to fill non-data spaces within the ABM PDU 670. Total length of each HL-PDU segment incorporated within a FLA/FB ABM PDU is equal to [(l-h-c)($n_{pdu}$)] if a CRC field is included, and equal to [(l-h)($n_{pdu}$)] if a CRC field is not included.

Figure 7:
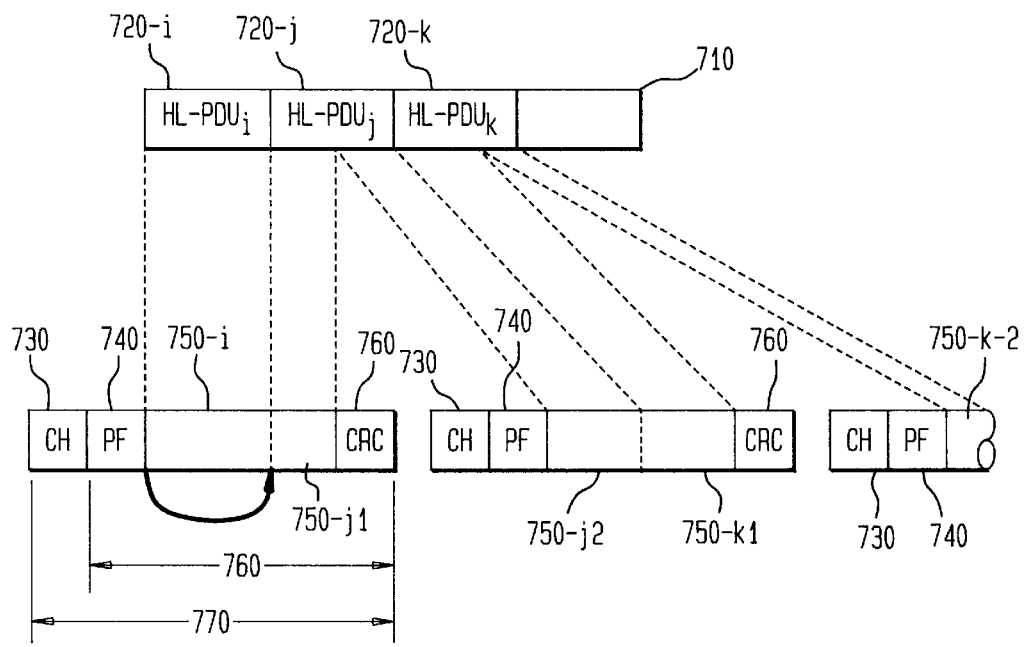
FIG. 7 is an exemplary representation of a HL-PDU and its incorporation within a Fixed Length Non-Aligned (FLNA) ABM PDU, in accordance with the present invention.

FIG. 7 is an exemplary representation of a fixed length HL-PDU bytestream 710 and its incorporation within a Fixed Length Non-Aligned (FLNA) ABM PDU bytestream, in accordance with the present invention. Converting and multiplexing a HL-PDU into a MOB as an ABM PDU occurs after link control negotiations between the transmitter and the receiver, specified later in the present description, have been completed. Therefore the transmitter and receiver each understand which higher layer protocols are being supported, the major category of ABM PDU utilized, the length of an ABM PDU, the information contained in an ABM PDU common header including the type field, and whether an error correction header/trailer is included. Since HL-PDU boundaries are not aligned when multiplexed as FLNA ABM PDUs, the receiver cannot identify specific HL-PDU boundaries with the information conveyed during link control negotiations alone. Therefore, in addition to a common header (CH) 730 and an optional CRC field 760, a pointer field 740 is also incorporated within each ABM PDU. The pointer field 740 is used to point to the first HL-PDU boundary within the ABM PDU 750 to which the pointer field 740 is assigned. If a HL-PDU is larger than the payload available in an ABM PDU, then the pointer field 740 points to the end of the ABM PDU payload in which it is contained. A SAR/PACK layer bytestream 710 is made up of fixed length HL-PDUs 720. Three consecutive HL-PDUs are shown at the SAR layer; HL-PDU$_i$720-i, HL-PDU$_j$720-j, and HL-PDU$_k$720-k. HL-PDU$_i$720-i is smaller than the available FLNA ABM PDU payload, thus it resides in the first portion 750-i of the payload at the ABM PDU. The next available HL-PDU, HL-PDU$_j$720-j is segmented at the SAR/PACK layer 710 since it is too large to completely fit within the remainder of the FLNA ABM PDU containing HL-PDU$_i$720-i. That segment of HL-PDU$_j$720-j which completely utilizes the remaining available space is packed into the ABM PDU 750-j1. The pointer field 740 is used to demarcate the boundary between HL-PDU$_i$750-i and the first segment of HL-PDU$_j$750-j1. The SAR/PACK layer PDU 780 is appended with a common header (CH) 730 of length h, as described in detail earlier, to create a FLNA ABM PDU 770. In addition, each FLNA ABM PDU is appended at the SAR/PACK layer with a CRC field 760 of length c, if desired. The remaining segment of HL-PDU$_j$720-j occupies the first segment 750-j2 of the next FLNA ABM PDU and the first segment of HL-PDU$_k$720-k occupies the remainder of the ABM PDU payload 750-k1. A pointer field 740 identifies the boundary between the first HL-PDU segment 750-j2 and the second HL-PDU segment 750-k1.

Figure 8:
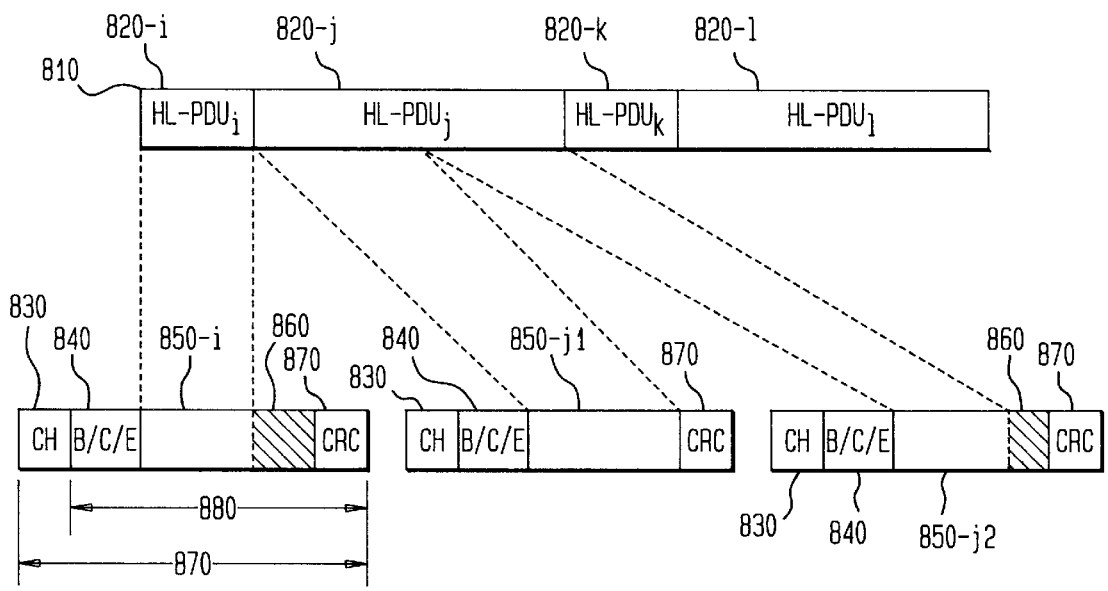
FIG. 8 is an exemplary representation of a HL-PDU and its incorporation within a Variable Length Aligned Single Block (VLA/SB) ABM PDU and a Variable Length Aligned Multiple Block (VLA/MB) ABM PDU, in accordance with the present invention.

FIG. 8 is an exemplary representation of a HL-PDU bytestream 810 and its incorporation within a MOB incorporating Variable Length Aligned Single Block (VLA/SB) ABM PDU and Variable Length Aligned Multiple Block (VLA/MB) ABM PDUs, in accordance with the present invention. Conversion and multiplexing of a HL-PDU into a MOB as an ABM PDU occurs after link control negotiations between the transmitter and the receiver, specified later in the present description, have been completed. Therefore the transmitter and receiver each understand which higher layer protocols are being supported, the major category of ABM PDU utilized, the length of an ABM PDU, the information contained in an ABM PDU common header including the type field, and whether an error correction header/trailer is included. VLA/SB and VLA/MB are both characterized by incorporating HL-PDUs into ABM PDUs so that the first byte of a new HL-PDU is also the first byte of a new ABM PDU payload. Because VLA/SB and VLA/MB are designed to efficiently support variable length higher layer protocols, a VL HL-PDU may be transported completely within one ABM PDU and require padding to completely fill the ABM PDU, or a VL HL-PDU may be transported completely within one ABM PDU and require no padding, or a VL HL-PDU may require multiple ABM PDUs to be completely transported, with or without the incorporation of padding. A VLA/SB from the HL-PDU bytestream is represented by HL-PDU$_i$820-i and VLA/MB is represented by HL-PDU$_j$820-j.

Variable length HL-PDUs carry length indicators in their headers. As previously described, if the protocol of a variable length HL-PDU is a flag-based protocol, then the flag is removed and a length field is added at the beginning of each HL-PDU at the HL-PDU Preparation Layer (HPPL). Also incorporated within VLA/SB and VLA/MB ABM PDUs is a B/C/E field 840. The B/C/E field 840 utilizes two bits to specify whether the payload of an ABM PDU is the beginning, continuation, or end segment of a higher layer PDU. A beginning segment ABM PDU is indicated with a B/C/E field 840 equal to '00', a continuation segment ABM PDU is indicated with a B/C/E field 840 equal to '01', an ending segment ABM PDU is indicated with a B/C/E field 840 equal to '10.' Unused ABM PDU transport bytes are padded to completely fill the unused space. If a higher layer PDU is carried as payload within a single ABM PDU, the B/C/E field 840 is equal to '11'. The length field in conjunction with the B/C/E field are used at the receiver to synchronize to the PDU boundary, and to resynchronize with the PDU boundary when synchronization is lost.

In the example illustrated in FIG. 8, four HL-PDUs are shown from a variable length HL-PDU bytestream 810, HL-PDU$_i$820-i, HL-PDU$_j$820-j, HL-PDU$_k$820-k, and HL-PDU$_l$820-l. HL-PDU$_i$820-i, an example demonstrating incorporation within a VLA/SB, is completely transported as the payload of one ABM PDU 870 and therefore requires no segmentation at the SAR/PACK layer. HL-PDU$_i$820-i, begins as the first byte of payload of an ABM PDU 870 at the ABM layer. Because HL-PDU$_i$820-i, is completely transported within one ABM PDU 870 as payload 850-i, a B/C/E field 840 value of '11' is assigned. Padding 860 is added to occupy unused ABM PDU bytes. An optional CRC field 870 is also supplied for error detection/correction. The combination of HL-PDU$_i$820-i, padding 860, B/C/E field 840, and optional CRC field 870 comprise a SAR/PACK layer PDU 880. The SAR/PACK layer PDU 880 is delivered to the ABM layer where a CH 830 is appended to create an ABM PDU 870 which is then multiplexed into the continuous MOB. HL-PDU$_j$820-j, in an example demonstrating incorporation within a VLA/MB, is segmented and partially transported as the payload of one ABM PDU 850-j1 and partially transported as the payload of a second ABM PDU 850-j2. Therefore, segmentation of HL-PDU$_j$820-j is accomplished at the SAR/PACK layer. The first segment of HL-PDU$_j$820-j, is sized to conform to the payload length of a ABM-PDU 850-j1 and appended with a B/C/E field and a CRC field 870 (if the option of error detection/correction has been selected by the system operator) to create a SAR/PACK layer PDU 880. A B/C/E field 840 value of '00' is assigned since the HL-PDU begins in the instant ABM PDU payload 850-j1, but is not completely transported within that ABM PDU. A CH 830 is also provided to comprise the completed ABM PDU 870. The remainder of HL-PDU$_j$820-j, is fully transported as the payload 850-j2 of the next ABM PDU. Payload 850-j2, padding 860, an optional CRC field 870, and a B/C/E field together comprise a SAR/PACK layer PDU 880. A B/C/E field 840 value of '10' is assigned since HL-PDU$_u$820-j transport is complete with this ABM PDU. A CH 830 is provided to comprise the completed ABM PDU 870. The completed ABM PDUs are then multiplexed into the continuous MOB.

Figure 9:
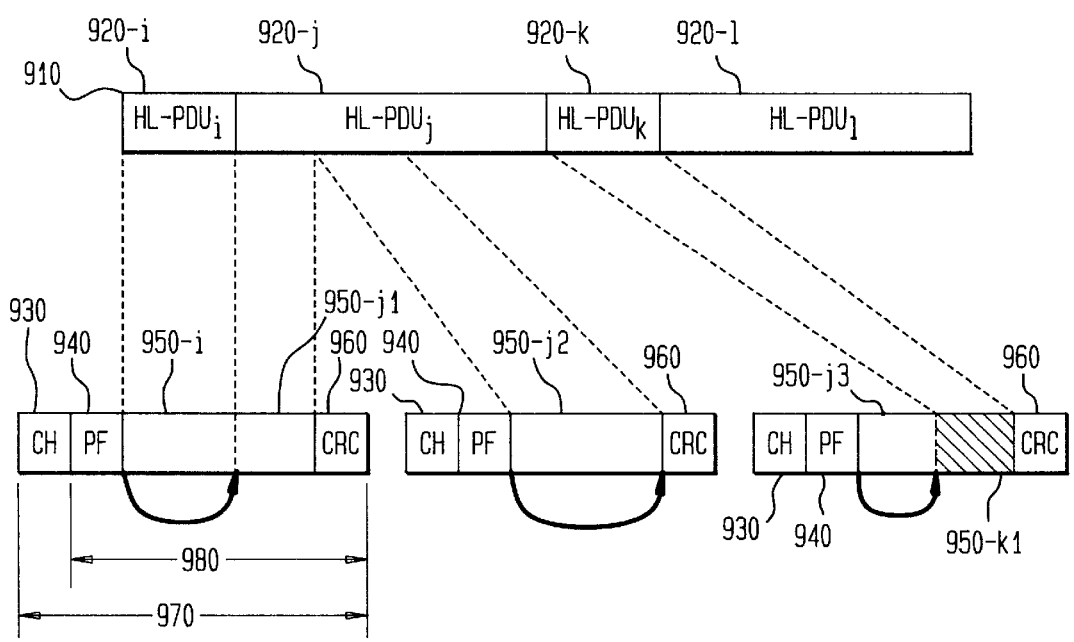
FIG. 9 is an exemplary representation of a HL-PDU and its incorporation within a Variable Length Non-Aligned (VLNA) ABM PDU, in accordance with the present invention.

FIG. 9 is an exemplary representation of a variable length HL-PDU bytestream 910 and its incorporation within a Variable Length Non-Aligned (VLNA) ABM PDU bytestream, in accordance with the present invention. Converting and multiplexing a HL-PDU into a MOB as an ABM PDU occurs after link control negotiations between the transmitter and the receiver, specified later in the present description, have been completed. Therefore the transmitter and receiver each understand which higher layer protocols are being supported, the major category of ABM PDU utilized, the length of an ABM PDU, the information contained in an ABM PDU common header including the type field, and whether an error correction header/trailer is included. The first byte of each individual HL-PDU is not aligned at the beginning of a new ABM PDU, rather, each available byte of an ABM PDU is utilized for transport of an HL PDU with no bandwidth wasted on padding. Since the beginning of a HL-PDU is not necessarily aligned with the first byte of the payload when multiplexed as a VLNA ABM PDU, the receiver cannot identify specific HL-PDU boundaries with the information conveyed during link control negotiations alone. Therefore, in addition to a common header (CH) 930 and an optional CRC field 960, a pointer field 940 is also incorporated within each ABM PDU. The pointer field 940 is used to point to the first HL-PDU boundary within the ABM PDU 950 to which the pointer field 940 is assigned. If a HL-PDU is larger than the payload available in an ABM PDU, then the pointer field 940 points to the end of the ABM PDU payload in which it is contained.

A SAR/PACK layer bytestream 910 is made up of variable length HL-PDUs 920. Four consecutive variable length HL-PDUs are shown at the SAR layer; HL-PDU$_i$920-$i$, HL-PDU$_j$920-$j$, HL-PDU$_k$920-$k$, and HL-PDU$_l$920-$l$. HL-PDU$_i$920-$i$ is smaller than the available VLNA ABM PDU payload, thus it resides in the first portion 950-$i$ of the payload at the ABM PDU. The next available HL-PDU, HL-PDU$_j$920$j$ is segmented at the SAR/PACK layer 910 since it is too large to completely fit within the remainder of the VLNA ABM PDU containing HL-PDU$_i$920-$i$. That segment of HL-PDU$_j$920-$j$ which completely utilizes the remaining available space is packed into the ABM PDU 950-$j$1. The pointer field 940 is used to demarcate the boundary between HL-PDU$_i$950-$i$ and the first segment of HL-PDU$_j$950-$j$1. The SAR/PACK layer PDU 980 is appended with a common header (CH) 930 to create a VLNA ABM PDU 970. In addition, each VLNA ABM PDU is appended at the SAR/PACK layer with a CRC field 960, if the optional CRC field 960 is selected by the system operator. The remainder of HL-PDU$_j$920-$j$ is too large to transport in the next ABM PDU, so HL-PDU$_j$920-$j$ is further segmented so that a portion of HL-PDU$_j$920-$j$ completely occupies the next ABM PDU payload. The pointer field for this ABM PDU points to the end of the payload since it is completely occupied by a segment from one HL-PDU. The remaining segment of HL-PDU$_j$920-$j$ occupies the first segment 950-$j$3 of the next VLNA ABM PDU and the first segment of HL-PDU$_k$920-$k$ occupies the remainder of the ABM PDU payload 950-$k$1. A pointer field 940 identifies the boundary between the first HL-PDU segment 950-$j$3 and the second HL-PDU segment 950-$k$1.

The prior description concerning the eight major categories of ABM PDUs, in conjunction with FIGS. 4 through 9, involved the assumption that link control negotiations between the transmitter and receiver had taken place at the time a link became active. In order to establish the link control negotiations, the present invention utilizes a default category of ABM PDU to convey the negotiation messages. If a default category of ABM PDU were not agreed upon at both the transmitter and receiver, then even though both receiver and transmitter were operable to support a number of categories of ABM PDUs, the receiver would not know what type of ABM PDU was being transmitted and therefore could not negotiate the link. One embodiment of the present invention utilizes FLA/SB as a default category to transport the control messages used to support link control negotiations, until link control negotiations are complete and another category is negotiated in its stead. Control messages are identified by assignment of a unique control message code number as the type field code for each control message ABM PDU.

In accordance with one exemplary embodiment of the present invention, during the process of link control negotiations, the assignment of an ABM PDU category to a HL PDU type is performed in such a way that each HL PDU type may be assigned as a different ABM PDU category. For example, ATM traffic is carried using FLA/SB ABM PDUs, STM traffic is carried in VLA/SB ABM PDUs, one class of VL traffic (e.g., file transfers involving almost all very large packets) is carried in VLA/MB ABM PDUs, and a second class of VL traffic (e.g., interactive traffic involving mixed size packets) is carried in VLNA ABM PDUs. Furthermore, when VL packets are relatively large, as is the case for the above cited example of file transfers involving very large packets, the pointer field overhead may be saved from the ABM-PDUs by using VLA/MB. Any inefficiency due to partially filled AMB-PDUs is small in comparison to the savings due to the absence of a pointer field in such cases.

The transport of a plurality of different higher layer (HL) protocol data units (PDUs) is supported with the present invention. As an illustrative, but not exhaustive example, the MOB support provided with the present invention encompasses asynchronous transfer mode (ATM) constant bit rate (CBR) protocol, ATM variable bit rate (VBR) protocol, ATM available bit rate (ABR) protocol, internet protocol (IP), internet packet exchange protocol (IPX), I.E.E.E. 802.3 protocol, synchronous transfer mode (STM) protocol, and frame relay (FR) protocol. Other protocols and subtypes are also supported. The common header (CH), as previously described, indicates the type or subtype of HL-PDU supported utilizing a type field. A type field of three bits represents eight or fewer types of HL-PDU. If it is desired to maintain the system operable for a greater number of HL-PDU types, then the CH type field is designed to contain an additional number of bits in its field. At the completion of link control negotiations, both a transmitter and receiver have a common view of the different types of HL-PDUs being supported, the major category of ABM PDU utilized for each HL-PDU, and parameter values assigned to each category of ABM PDU. In the event that only one type of HL-PDU is transmitted, the transmitter and receiver are both informed during link control negotiations that a CH is not required (since a type field identifier is not needed) and therefore the CH will be absent from all ABM PDUs transmitted. Eliminating the CH field when only one protocol type is being transmitted prevents the imposition of additional overhead and wasted bandwidth when a type identification is not required.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention and is not intended to illustrate all possible forms thereof. It is also understood that the words used are words of description, rather than limitation, and that details of the structure may be varied substantially without departing from the spirit of the invention and the exclusive use of all modifications which come within the scope of the appended claims are reserved.

What is claimed is:

1. A method for transport of a plurality of higher layer protocol data units (PDUs) from a transmitter to a receiver over a transmission medium via a multiple protocol bytestream, said method comprising the steps of:

extracting individual protocol data units (PDUs) from each component bytestream of said plurality of higher layer PDUs;

segmenting said individual PDUs into individual PDU segments, if said individual PDUs are longer than a selected length;

selecting at least one of said individual PDU segments to comprise each of a plurality of fixed-length asynchronous block multiplexing (ABM) payloads;

appending a type identification field to each of said plurality of fixed-length ABM payloads to form a plurality of ABM PDUs; and multiplexing said ABM PDUs over a multiple protocol bytestream, wherein said multiple protocol bytestream is transmitted over said transmission medium.

2. The method in accordance with claim 1 further comprising the steps of:

creating an integral number of synchronous transfer mode (STM) channels, each STM channel dedicated to a separate STM connection;

providing sufficient bandwidth to provide for a STM signaling bandwidth associated with said integral number of STM channels; and incorporating said STM signaling bandwidth, said integral number of STM channels, and a quantity of padding as an STM ABM PDU, said padding required to make said STM ABM PDU equal in length to said selected length.

3. The method in accordance with claim 1 wherein synchronous transfer mode (STM) data is transmitted within channels in a region reserved for STM data transmission.

4. The method in accordance with claim 1 wherein said higher layer PDUs are selected from a group consisting of asynchronous transfer mode (ATM) PDUs, variable length (VL) PDUs, and synchronous transfer mode (STM) PDUs.

5. The method in accordance with claim 1 wherein each of said ABM PDU further includes a cyclical redundancy check (CRC) field for data error protection.

6. The method in accordance with claim 1 wherein each of said ABM PDUs further includes an error protection field for error detection and correction of said type identification field.

7. The method in accordance with claim 1 wherein said ABM PDUs pay load size is selected to exactly accommodate an asynchronous transfer mode (ATM) cell.

8. The method in accordance with claim 1 wherein ABM PDU type multiplexing priority is awarded to higher layer PDUs which are most delay sensitive.

9. The method in accordance with claim 8 wherein absolute ABM PDU type multiplexing priority is awarded to synchronous transfer mode (STM) PDUs.

10. The method in accordance with claim 1 further comprising the step of storing said ABM PDUs corresponding to synchronous transfer mode (STM) PDUs at a buffer located at said receiver, said buffer incorporated so that said ABM PDUs corresponding to an STM channel may arrive at a time other than that corresponding to a desired STM channel playout time.

11. The method in accordance with claim 1 wherein at least one of said ABM PDUs is characterized as a fixed length aligned single block (FLA/SB) PDU.

12. The method in accordance with claim 1 wherein at least one of said ABM PDUs is characterized as a fixed length aligned multiple block (FLA/MB) PDU.

13. The method in accordance with claim 1 wherein at least one of said ABM PDUs is characterized as a fixed length aligned fractional block (FLA/FB) PDU.

14. The method in accordance with claim 1 wherein at least one of said ABM PDUs is characterized as a fixed length non-aligned (FLNA) PDU.

15. The method in accordance with claim 14 wherein said FLNA PDU incorporates a pointer field, said pointer field utilized to indicate higher layer PDU boundaries within said FLNA PDU.

16. The method in accordance with claim 1 wherein at least one of said ABM PDUs is characterized as a variable length aligned single block (VLA/SB) PDU.

17. The method in accordance with claim 1 wherein at least one of said ABM PDUs is characterized as a variable length aligned multiple block (VLA/MB) PDU.

18. The method in accordance with claim 1 wherein at least one of said ABM PDUs is characterized as a variable length non-aligned (VLNA) PDU.

19. The method in accordance with claim 18 wherein said VLNA PDU incorporates a pointer field, said pointer field utilized to indicate higher layer PDU boundaries within said VLNA PDU.

20. A method for transport of a plurality of higher layer protocol data units (PDUs) from a transmitter to a receiver over a transmission medium via a multiple protocol bytestream, said method comprising the steps of:

extracting individual protocol data units (PDUs) from each component bytestream of said plurality of higher layer PDUs;

segmenting said individual PDUs into individual PDU segments, if said individual PDUs are longer than a selected length;

selecting at least one of said individual PDU segments to comprise each of a plurality of fixed-length asynchronous block multiplexing (ABM) payloads;

appending a type identification field to each of said plurality of fixed-length ABM payloads an ABM PDU, if said plurality of higher layer PDUs belong to more than one protocol type;

reclassifying each of said plurality of fixed-length ABM payloads as ABM PDUs if said plurality of higher layer PDUs are of one protocol type;

queuing said ABM PDUs at an input to said multiplexer for transmission over said transmission medium;

multiplexing said ABM PDUs over a multiple protocol bytestream; and transmitting said multiple protocol bytestream over said transmission medium.

21. The method in accordance with claim 20 further comprising the steps of:

creating an integral number of synchronous transfer mode (STM) channels, each STM channel dedicated to a separate STM connection;

providing sufficient bandwidth to provide for a STM signaling bandwidth associated with said integral number of STM channels; and incorporating said STM signaling bandwidth, said integral number of STM channels, and a quantity of padding as an STM ABM PDU, said padding required to make said STM ABM PDU equal in length to said selected length.

22. The method in accordance with claim 20 wherein synchronous transfer mode (STM) data is transmitted within channels in a region reserved for STM data transmission.

23. The method in accordance with claim 20 wherein said higher layer PDUs are selected from a group consisting of asynchronous transfer mode (ATM) PDUs, variable length (VL) PDUs, and synchronous transfer mode (STM) PDUs.

24. The method in accordance with claim 20 wherein each of said ABM PDUs further includes a cyclical redundancy check (CRC) field for data error protection.

25. The method in accordance with claim 20 wherein each of said ABM PDUs further includes a error protection field for error detection and correction of said type identification field.

26. The method in accordance with claim 20 wherein said ABM PDUs payload size is selected to exactly accommodate an asynchronous transfer mode (ATM) cell.

27. The method in accordance with claim 20 wherein ABM PDU type multiplexing priority is awarded to higher layer PDUs which are most delay sensitive.

28. The method in accordance with claim 27 wherein absolute ABM PDU type multiplexing priority is awarded to synchronous transfer mode (STM) PDUs.

29. The method in accordance with claim 20 further comprising the step of storing said ABM PDUs corresponding to synchronous transfer mode (STM) PDUs at a buffer located at said receiver, said buffer incorporated so that each STM channel may arrive at a time other than that corresponding to a desired STM channel playout time.

30. The method in accordance with claim 20 wherein at least one of said ABM PDUs is characterized as a fixed length aligned single block (FLA/SB) PDU.

31. The method in accordance with claim 20 wherein at least one of said ABM PDUs is characterized as a fixed length aligned multiple block (FLA/MB) PDU.

32. The method in accordance with claim 20 wherein at least one of said ABM PDUs is characterized as a fixed length aligned fractional block (FLA/FB) PDU.

33. The method in accordance with claim 20 wherein at least one of said ABM PDUs is characterized as a fixed length non-aligned (FLNA) PDU.

34. The method in accordance with claim 33 wherein said FLNA PDU incorporates a pointer field, said pointer field utilized to indicate higher layer PDU boundaries within said FLNA PDU.

35. The method in accordance with claim 20 wherein at least one of said ABM PDUs is characterized as a variable length aligned single block (VLA/SB) PDU.

36. The method in accordance with claim 20 wherein at least one of said ABM PDUs is characterized as a variable length aligned multiple block (VLA/MB) PDU.

37. The method in accordance with claim 20 wherein at least one of said ABM PDUs is characterized as a variable length non-aligned (VLNA) PDU.

38. The method in accordance with claim 37 wherein said VLNA PDU incorporates a pointer field, said pointer field utilized to indicate higher layer PDU boundaries within said VLNA PDU.

39. A system for transport of a plurality of application layer protocol data unit (PDU) types, said system including a transmitter, a transmission medium, and a receiver, said system comprising:

a higher layer PDU preparation layer (HPPL) at said transmitter, said HPPL accepting a plurality of protocol types from an application layer, each of said plurality of protocol types assigned to a specific type channel, and each of said specific type channels accepting a plurality of application layer PDUs, said HPPL operable to remove a length indicating flag and replace said length indicating flag with a length field whenever said application layer PDU contains said length indicating flag;

a segmentation and reassembly/packing (SAR/PACK) layer at said transmitter, said SAR/PACK layer operable to accept the output of said HPPL and extract individual application layer PDUs from each specific type channel, said individual application layer PDUs segmented into SAR/PACK PDUs equal to a specified length if said individual application layer PDUs are longer than said specified length; and an asynchronous block multiplexing (ABM) layer at said transmitter, said ABM layer operable to append each of said SAR/PACK PDUs with a common header, said combination of SAR/PACK PDU and said common header forming an ABM PDU, said ABM layer further operable to multiplex said ABM PDUs from each of said specific type channels into a multiple protocol bytestream, wherein said multiple protocol bytestream is transmitted over said transmission medium to said receiver, said receiver operable to process said multiple protocol bytestream through an ABM layer, a SAR/PACK layer, and a HLLP layer, thus converting said multiple protocol bytestream into said plurality of application layer PDUs.

40. The system in accordance with claim 39 wherein said application layer PDUs are selected from a group consisting of asynchronous transfer mode (ATM) PDUs, variable length (VL) PDUs, and synchronous transfer mode (STM) PDUs.

41. The system in accordance with claim 39 wherein each of said ABM PDUs further include a cyclical redundancy check (CRC) field for data error protection.

42. The system in accordance with claim 39 wherein each of said ABM PDUs further include an type identification field, said type identification field utilized to convey application layer PDU mode to said receiver.

43. The system in accordance with claim 42 wherein an error protection field is included for error detection and correction of said type identification field.

* * * * *